United States Patent [19]

Brunet

[11] Patent Number: 4,616,859
[45] Date of Patent: Oct. 14, 1986

[54] QUICK-COUPLING CONNECTOR

[75] Inventor: Patrice Brunet, Neuilly-sur-Seine, France

[73] Assignee: Poutrait-Morin, Aubervilliers, France

[21] Appl. No.: 691,766

[22] Filed: Jan. 16, 1985

[30] Foreign Application Priority Data

Jan. 16, 1984 [FR] France ................................ 84 00562

[51] Int. Cl.⁴ ............................................. F16L 39/00
[52] U.S. Cl. .................................... 285/317; 285/175;
285/319; 285/320; 285/423; 285/921
[58] Field of Search ............... 285/319, 423, 921, 308,
285/317, 320, 17.5; 24/16 PB, 688, 17 AP, 30 SP

[56] References Cited

U.S. PATENT DOCUMENTS

| 3,250,551 | 5/1966 | Draudt | 285/7 |
| 3,602,009 | 8/1971 | Powell | 285/320 X |
| 3,686,896 | 8/1972 | Rutter | 285/319 X |
| 4,219,222 | 8/1980 | Brusadin | 285/DIG. 22 |
| 4,445,536 | 5/1984 | Willis | 285/119 X |

FOREIGN PATENT DOCUMENTS

| 7211007 | 12/1972 | France |
| 2474639 | 7/1981 | France |
| 278093 | 12/1951 | Switzerland | 285/320 |
| 1931 | of 1875 | United Kingdom | 285/320 |

*Primary Examiner*—Dave W. Arola
*Attorney, Agent, or Firm*—Charles E. Brown; Charles A. Brown

[57] ABSTRACT

A quick-coupling connector for an air valve comprising, in one-piece molded plastic construction, a body for receiving the air valve, an operating member rockably mounted on the body about a pivot axis, a strap which defines a preloaded leaf spring joining the operating member to the body and defining a preloaded leaf spring for urging a clamping member carried by the operating member toward a clamping position.

15 Claims, 5 Drawing Figures

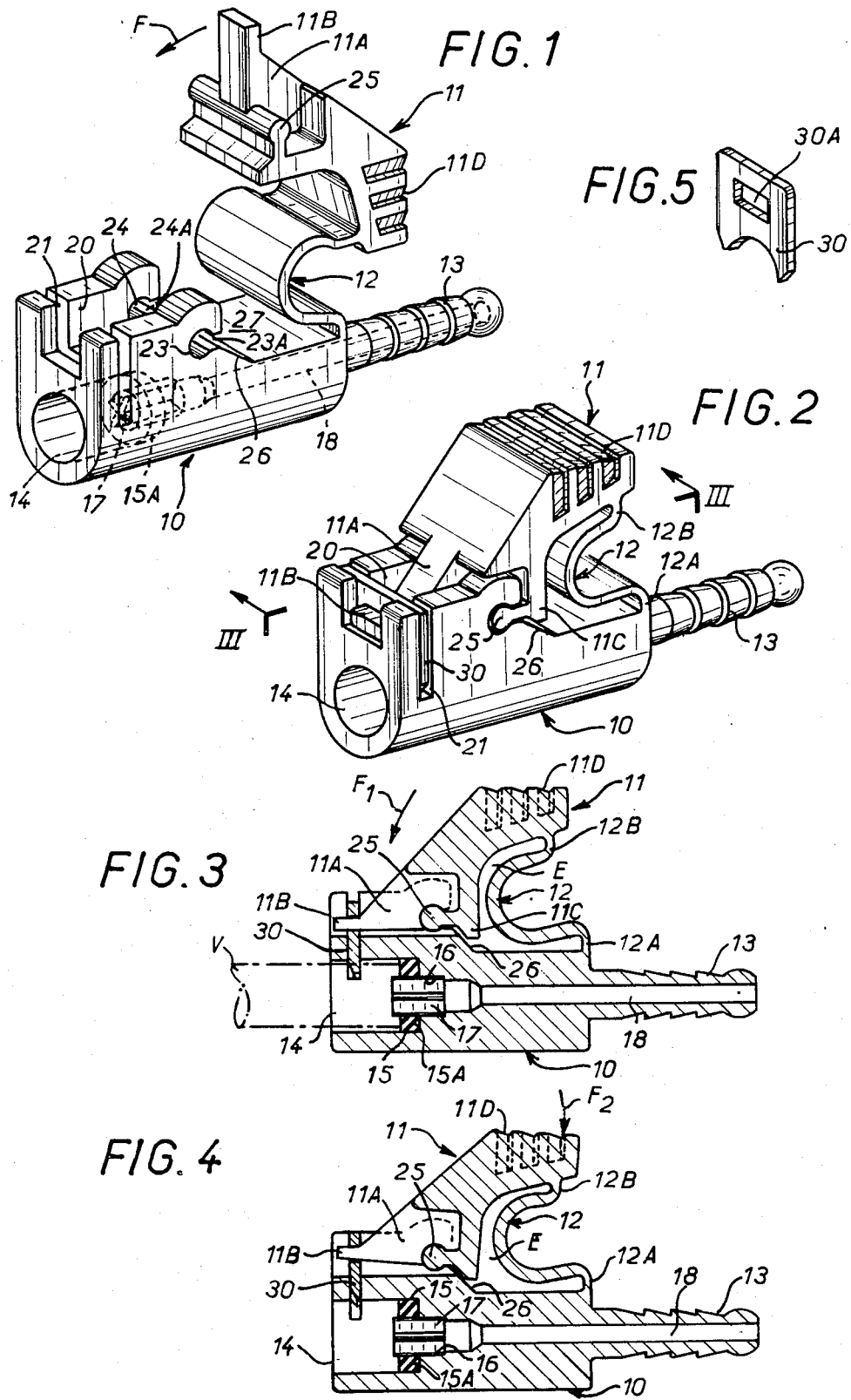

QUICK-COUPLING CONNECTOR

BACKGROUND OF THE INVENTION

The present invention relates to quick-coupling connectors for inflation on air valves for tires or air chambers.

As is known such connectors essentially comprise a body, an operating member rockably mounted about a pivot, a spring biasing the operating member toward an operative position, a clamping member slidably mounted on the body and controlled by the operating member for releasably coupling the connector to the hollow stem of the air valve.

The body is adapted to receive the free end of the hollow stem of the air valve. A valve actuator carrying a gasket is threadedly engaged in the body, the valve actuator being engageable with the valve member of the air valve for bringing the tyre or air chamber into communication with a source of compressed air to which the body is also connected.

The various metal parts of such a connector namely the connector body, the pivot, the valve actuator, and even the clamping member for releasably coupling the connector to the air valve stem require machining. In addition, the various parts have to be assembled after fabrication. Also, inventories of the various parts must be maintained and monitored. Given the considerable number of manufacturing and assembly operations which go into the manufacture of such a connector it is readily appreciated that these factors inevitably have repercussions on the ultimate cost of the article.

SUMMARY OF THE INVENTION

An object of the present invention is to provide a quick-coupling connector generally of the foregoing type which is of extremely simple construction compared to prior art devices, resulting in substantially reduced production costs.

According to the invention there is provided a quick-coupling connector for an air valve, the connector comprising a body adapted to be connected to the air valve and to a hose for supplying compressed air, an operating member rockably mounted on the body about a pivot axis, a spring biasing the operating member to an operative position, a clamping member controlled by the operating member and slidably mounted on the body between a clamping position under the bias of the spring for temporarily securing the connector to the air valve and a retracted position for positioning the connector on and removing it from the air valve, characterised in that the body, operating member and the spring are of one-piece molded construction, a strap which defines the spring joining the operating member to the body.

Preferably, the strap constitutes a preloaded leaf spring, and preferably the operating member includes a pivot adapted to be engaged in transversely open bearing sections formed on the body, the strap biasing the pivot into engagement in the bearing sections.

Preferably, a space is formed between the under side of the rear part of the operating member and the upper side of the rear part of the body for accommodating the strap, the strap having a convex side facing forwardly.

The manufacture of the connector is one-piece molded construction results in a marked simplification of the assembly operations which are reduced to positioning the clamping member, the actuator which controls the valve member of the air valve, and a gasket, whereby the present connector is particularly suited for mass production. In conjunction therewith, the inventory costs are limited to stocking the above-named components. It follows that the machining and assembly operations and handling of components are reduced to a strict minimum and therefore the ultimate production cost is reduced substantially.

These and other features and advantages of the invention will be brought out in the description which follows, given by way of example, with reference ot the accompanying drawings.

BRIEF DESCRIPTION OF THE DRAWINGS

FIG. 1 is a perspective view of a connector embodying the invention as it removed from its mold;

FIG. 2 is a view similar to that of FIG. 1 showing the connector ready to be used;

FIG. 3 is a longitudinal sectional view taken on line III—III in FIG. 2;

FIG. 4 is a view similar to that of FIG. 3 in which the clamping member is shown in its retracted position by rocking the operating member; and FIG. 5 shows the clamping member taken on its own.

DESCRIPTION OF THE PREFERRED EMBODIMENT

According to the preferred embodiment illustrated in the drawings the quick-coupling connector for an air valve is of one-piece molded plastic construction. The connector comprises a body 10 and an operating member 11 joined together by a strap 12 defining a leaf spring.

The body 10 has a first part generally forwardly of the pivot axis and a rear part rearwardly of the pivot axis. The body 10 has in its front part a cavity 14. At the rear end of the cavity 14 is a first recess 15 for housing a gasket 15A, cooperable with the open end of the hollow stem of the air valve V (illustrated shcematically in chain-dotted lines) and a second recess 16 which extends rearwardly beyond the first recess houses a cruciform valve actuator 17 for controlling the valve member (not shown).

Rearwardly from the second recess 16 an axial passage extends to the rear end of the connector through a hose nipple 13 adapted to be connected to a hose for supplying compressed air (not shown).

The upper side of the front part of the body 10 has a boss which extends axially to about the middle of the connector. The boss has a longitudinal groove 20 and a transverse groove 21 which opens into the cavity 14. Rearwardly of the transverse groove 21 the boss comprises two aligned bearing sections 23, 24 to the respective sides of the longitudinal groove 20. The bearing sections 23, 24 have transverse openings 23A, 24A, for inserting a pivot 25 formed on the operating member 11. Rearwardly of the bearing sections 23, 24 is an inclined plane or abutment 26 followed by a flat surface 27 running substantially to the rear end of the body 10.

The part of the operating member 11 disposed forwardly of the pivot 25 is referred to as the front part and the part rearwardly thereof is referred to as the rear part. As illustrated, the rear part of the operating member 11 is joined to the rear end of the body 10 by a strap 12 which is a resiliently deformable flat strip substantially U-shaped in cross section with a substantially semicircular bight or intermediate portion. The ends 12A, 12B of the strap 12 is attached respectively to the body 10 and the operating member 11 are reduced in thickness to provide suitable flexibility. The width of the strap 12 is substantially that of the rear part of the body 10 and the rear part of the operating member 11.

As clearly visible, particularly in FIGS. 2 to 4, the strap 12 is accommodated in a space E by an appropriate configuration of the under side of the rear part of the operating member 11 and the upper side of the rear part of the body 10, and the convex side of the U-shaped strap 12 faces fowardly of the body 10.

The front part of the operating member 11 comprises a protrusion or nose 11A adapted to be engaged in the aforesaid longitudinal groove 20. The pivot 25 is joined to a transversely extending heel portion 11c formed on the rear part of the operating member 11. The rear part of the operating member 11 has transversely extend ribbing 11D on its outer surrace for faciliting gripping.

The end of the front tip 11B of the protrusion 11C is adapted to carry a clamping member or plate 30 which has an aperture 30A (see FIG. 5) of complementary configuraion to the section of the front tip 11B.

When the connector is removed from its mold it is as illustrated in FIG. 1, the operating member is spaced from the body 10 and the strap 12 which connects the operating member and the body is in a relaxed condition.

To assemble the connector the clamping member 30 is inserted on the front tip 11b of the protrusion 11A. The operating member 11 is swung in the direction of arrow F 1 until the pivot 25 is engaged in the bearing sections 23, 24 through the rearwardly facing openings 23A, 24A.

It will be noted that the aforesaid openings 23A, 24A are slightly smaller than the cross section of the pivot 25 so that the pivot must be forced into the bearing sections 23, 24 and thereafter the bearing sections 23, 24 hold the pivot in position.

Strap 12 is compressed as the operating member 11 is swung into position thereby preloading biasing the operating member 11 into its operative position and thereby urging the clamping member 30 into its advanced, clamping position as shown in FIG. 3.

In FIG. 3 the connector is shown connected to the hollow stem of an air valve V. The free open end of the stem is in contact with the gasket 15A so that the fluid-tightness is effected while valve actuator 17 controls the valve member (not shown) located inside the hollow stem of the air valve.

As shown in FIG. 3, the connector is secured temporarily to the stem of the air valve V under the bias of the strap 12 defining the spring which tends to open and urges the operating member 11 in the direction of arrow F1 or counter clockwise about the pivot axis which forces the clamping member 30 toward its advanced, clamping position against the hollow stem of the air valve V.

To disconnect the connector from the hollow stem of the air valve V, a force is applied to the operating member 11 in the direction of arrow F2 in FIG. 4 which causes the operating operating member 11 to rock against the bias of strap 12 in the clockwise direction by pivoting about the axis of pivot 25 in the bearing sections 23, 24. The clockwise rocking of the operating member 11 lifts the clamping member 30 and withdraws it out of the interior of the cavity 14. The rocking movement of the operating member 11 in the direction F2 is limited by the abutment of the heel portion 11C on the operating member with the inclined plane or abutment 26.

If the force applied to the rear part of the operating member 11 is released, the operating member automatically returns to its operative position and the clamping member 30 to its clamping position under the bias of the strap 12.

The small number of separate parts employed in the construction of the present connector should be underscored. The assembly operation is extremely easy and fast since it is limited to positioning the valve actuator 17, the gasket 15A and the clamping member 30.

Of course the invention is not limited to the illustrated and described embodiment but, on the contrary admits, of various alternatives and modifications understood to these skilled in the art without departing from the scope of the appended claims.

What I claim is:

1. A quick-coupling connector for an air valve, said connector comprising a hollow body having a first orifice adapted to be connected to the air valve and a second orifice in communication with said first orifice and adapted to be connected to a hose for supplying compressed air, an operating member, mounting means rockably mounting said operating member on said body about a pivot axis, a spring biasing said operating member to an operative position, a clamping member for clamping the air valve to said body, said clamping member being controlled by said operating member and being slidably mounted on said body between a clamping position under the bias of said spring for temporarily securing said connector to the air valve and a retracted position for positioning said connector on and removing said connector from the air valve, the improvement wherein said operating member and said spring are of one-piece molded construction with there being a strap defining said spring and joining said operating member to said body.

2. The connector according to claim 1, wherein said strap constitutes a preloaded leaf spring.

3. The connector according to claim 2, wherein said strap is generally U-shaped in cross section.

4. The connector according to claim 3, wherein said strap has an intermediate or bight portion which is generally semicircular in cross section.

5. The connector according to claim 1, wherein said body comprises a front part, said first orifice being located in said front part, and a rear part, containing said second orifice, extended by a hose nipple for receiving the hose.

6. The connector according to claim 3, wherein said operating member comprises a front part forwardly of said pivot axis which defines a protrusion carrying said clamping member and a rear part rearwardly of said pivot axis, said strap being connected to said rear part of said body.

7. The connector according to claim 6, wherein said clamping member carried on said protrusion is slidably mounted in a transverse groove formed in said body and communicating with the interior of a cavity in said front part of said body which receives a hollow stem of the air valve.

8. The connector according to claim 7, wherein a longitudinal groove is formed on said front part of said body for receiving said protrusion and communicates with said transverse groove.

9. The connector according to claim 6, wherein a space is formed between an under side of said rear part of said operating member and an upper side of said rear part of said body for accommodating said strap, said strap having a convex side facing forwardly.

10. The connector according to claim 5, wherein said mounting means include bearing sections provided on said front part of said body for receiving a pivot formed on said operating member.

11. The connector according to claim 10, wherein said body comprises rearwardly of said bearing sections and slightly therebelow an abutment adapted to cooperate with a heel portion on said operating member for limiting rocking movement of said operating member.

12. The connector according to claim 10, wherein said bearing sections have openings for inserting and maintaining said pivot therein.

13. The connector according to claim 12, wherein said openings in said gearing sections open rearwardly facing said strap.

14. The connector according to claim 1, wherein ends of said strap connecting said strap to said body and to said operating member respectively are of reduced thickness as compared to the rest of said strap.

15. The connector according to claim 1, wherein said mounting means includes a pivot adapted to be engaged in transversely open bearing sections formed on said body, said strap biasing said pivot into engagement in said bearing sections.

* * * * *